(12) United States Patent
Zhong et al.

(10) Patent No.: US 11,606,013 B2
(45) Date of Patent: Mar. 14, 2023

(54) RESOLVER INTEGRATION KIT FOR VARIABLE RELUCTANCE RESOLVER

(71) Applicant: Schaeffler Technologies AG & Co. KG, Herzogenaurach (DE)

(72) Inventors: Guihui Zhong, Charlotte, NC (US); Edward J. Wey, Waxhaw, NC (US); Marion Jack Ince, Mount Holly, NC (US); Charles Schwab, Fort Mill, SC (US); John Tate, Cornelius, NC (US); Ryan Carlino, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 367 days.

(21) Appl. No.: 16/795,127

(22) Filed: Feb. 19, 2020

(65) Prior Publication Data
US 2021/0257894 A1    Aug. 19, 2021

(51) Int. Cl.
| | |
|---|---|
| *G01D 11/24* | (2006.01) |
| *G01P 3/48* | (2006.01) |
| *F16C 41/00* | (2006.01) |
| *H02K 24/00* | (2006.01) |
| *F16C 19/04* | (2006.01) |
| *B60K 1/00* | (2006.01) |
| *F16C 19/06* | (2006.01) |

(52) U.S. Cl.
CPC .............. *H02K 24/00* (2013.01); *B60K 1/00* (2013.01); *F16C 19/04* (2013.01); *F16C 19/06* (2013.01); *F16C 41/00* (2013.01); *F16C 41/007* (2013.01); *G01D 11/245* (2013.01); *G01P 3/48* (2013.01)

(58) Field of Classification Search
CPC ........ G01D 11/245; G01P 3/48; F16C 41/007
See application file for complete search history.

(56) References Cited

U.S. PATENT DOCUMENTS

| | | | |
|---|---|---|---|
| 5,428,290 A | 6/1995 | Porcher | |
| 7,307,415 B2 | 12/2007 | Seger et al. | |
| 9,103,382 B2 * | 8/2015 | Muramatsu | F16D 3/2245 |
| 9,605,748 B2 * | 3/2017 | Wang | F16H 57/08 |
| 10,012,267 B2 | 7/2018 | Kegeler | |
| 10,927,896 B2 * | 2/2021 | Zhong | F16C 33/585 |
| 2003/0230945 A1 | 12/2003 | Okubo et al. | |
| 2007/0101956 A1 | 5/2007 | Schafer et al. | |

(Continued)

FOREIGN PATENT DOCUMENTS

| | | |
|---|---|---|
| EP | 1580533 A2 | 9/2005 |
| JP | 2006158005 A | 6/2006 |

*Primary Examiner* — Reena Aurora
(74) *Attorney, Agent, or Firm* — Volpe Koenig

(57) ABSTRACT

An integration kit is disclosed herein that allows for mounting of a resolver trigger wheel relative to a bearing assembly, resolver, and rotor. The integration kit simplifies assembly and saves space. The integration kit includes a resolver integration sleeve that includes a first axial section including a radially inner surface defining a bearing support and radially inwardly extending flange defining an axial abutment surface. The resolver integration sleeve also includes a second axial section including at least one anti-rotation slot dimensioned to receive a portion of a trigger wheel, at least one anti-rotation tab extending axially towards the first axial section and dimensioned to be received by a rotor, at least one securing tab extending radially outward and configured to engage a trigger wheel, and a radially outwardly extending flange.

20 Claims, 13 Drawing Sheets

(56) References Cited

U.S. PATENT DOCUMENTS

2013/0022302 A1 1/2013 Watanabe et al.
2017/0016394 A1 1/2017 Scholtes
2019/0218945 A1 7/2019 Kandolf \* cited by examiner

US 11,606,013 B2

RESOLVER INTEGRATION KIT FOR VARIABLE RELUCTANCE RESOLVER

FIELD OF INVENTION

The present disclosure relates to an integration kit for use with a variable reluctance resolver.

BACKGROUND

Fuel efficiency and environmental friendly requirements demand that vehicles and automobiles be more efficient and/or rely completely or partially on electric drive systems. As a result of these demands, an increasing number of hybrid and electric vehicles are coming into the market. The continued shift to electric drive systems has led to the need for more robust motor control systems.

A variable reluctance (VR) resolver angular position sensor has been commonly used for sensing an absolute angular position of the associated rotor. Sensors including these types of resolvers are desirable based on their robustness, high reliability, simple construction, high temperature capability, high resolution, high contamination resistance and high vibration resistance. One drawback of resolvers is the requisite space required to install the resolver and its associated components. This is particularly an issue due to the need to provide high resolution, which is dictated by the number of windings in the resolver.

It would be desirable to provide an arrangement that properly positions the components associated with a resolver assembly that is light-weight and compact.

SUMMARY

An integration kit is disclosed herein that allows for mounting of a resolver trigger wheel relative to a bearing assembly, resolver, and rotor. The integration kit simplifies assembly and saves space. The integration kit includes a resolver integration sleeve that includes a first axial section including a radially inner surface defining a bearing support and radially inwardly extending flange defining an axial abutment surface. The resolver integration sleeve also includes a second axial section including at least one anti-rotation slot dimensioned to receive a portion of a trigger wheel, at least one securing tab extending radially outward and configured to engage a trigger wheel, and a radially outwardly extending flange. At least one of the first axial section or the second axial section includes at least one anti-rotation tab dimensioned to be received by a rotor. The integration sleeve is configured to engage at least three components: the rotor, the trigger wheel, and the bearing assembly, all of which are associated with a resolver assembly. The integration sleeve is configured to engage each of these components via integrally formed elements, such as anti-rotation slots, axial abutment surfaces, anti-rotation tabs, securing tabs, etc.

In one embodiment, a radial step is defined between the first axial section and the second axial section, and the first axial section has a smaller outer diameter than an outer diameter of the second axial section.

The sleeve can be formed via at least one of deep-drawing or stamping. In one embodiment, the sleeve has a uniform thickness.

In one embedment, the at least one anti-rotation slot, the at least one anti-rotation tab, and the at least one securing tab are each circumferentially spaced away from each other along an outer surface of the sleeve.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along the axis of an assembly. "Radially" refers to a direction inward and outward from the axis of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
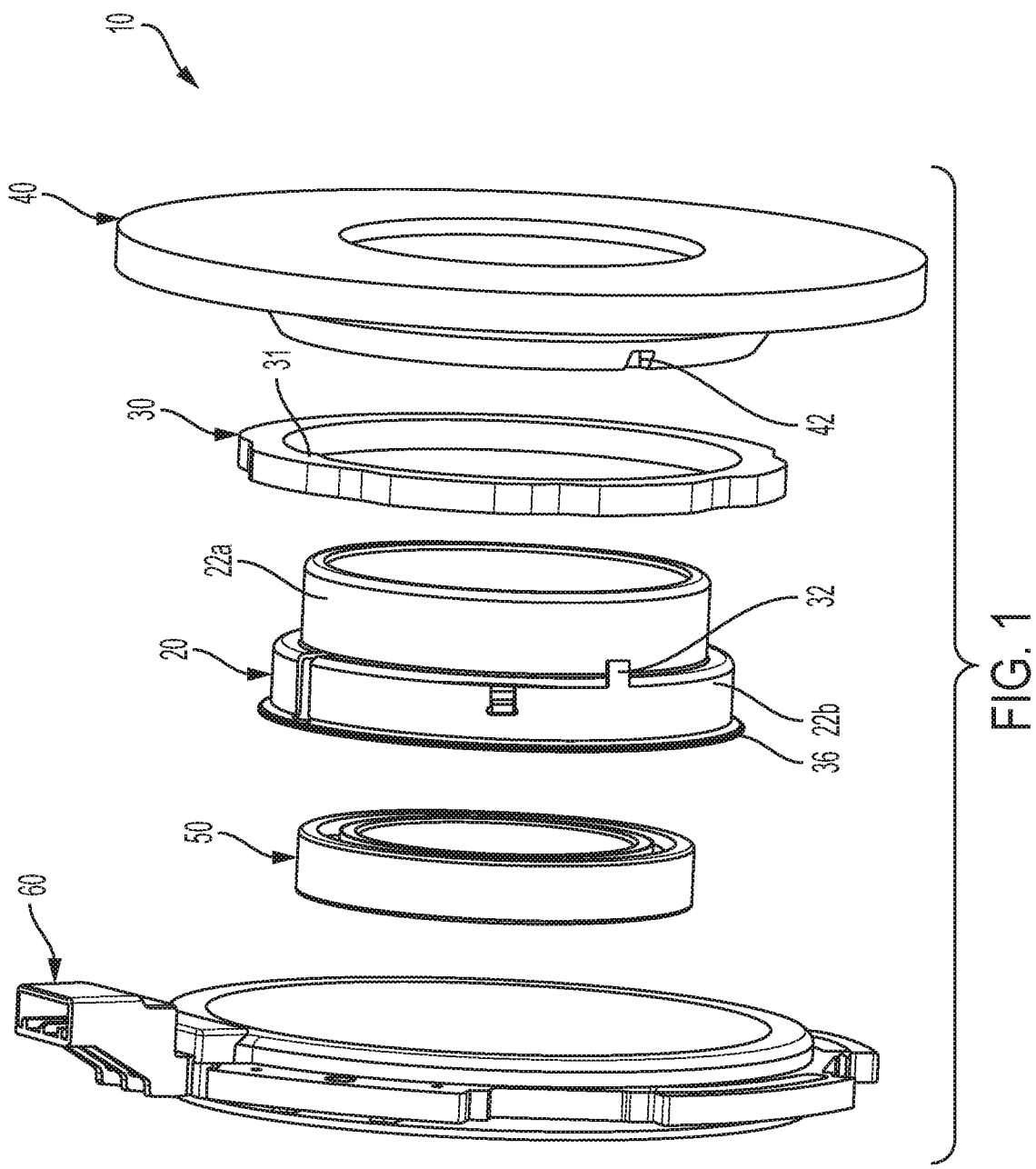
FIG. 1 is a perspective exploded view of a resolver integration kit.
Figure 3A:
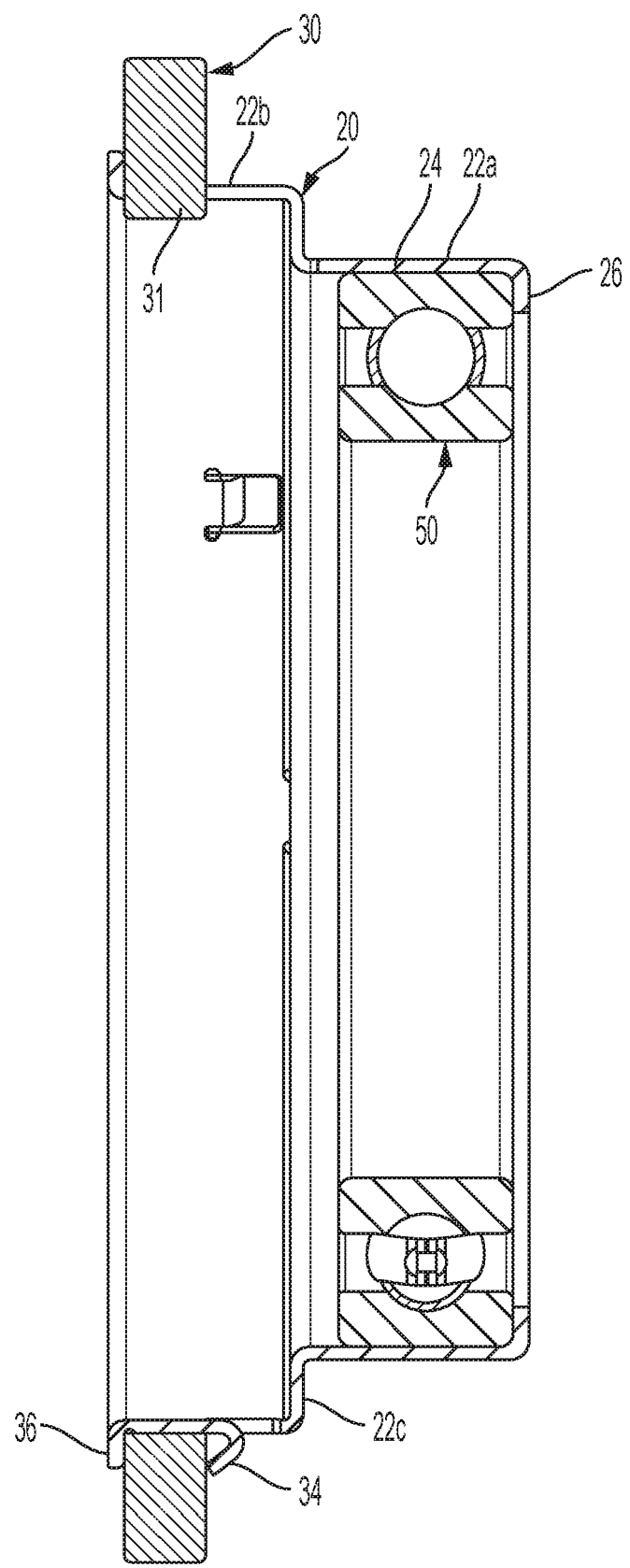
FIG. 3A is a side cross-sectional view of the sleeve of FIGS. 2A-2C in addition to a trigger wheel and a bearing assembly.
Figure 3B:
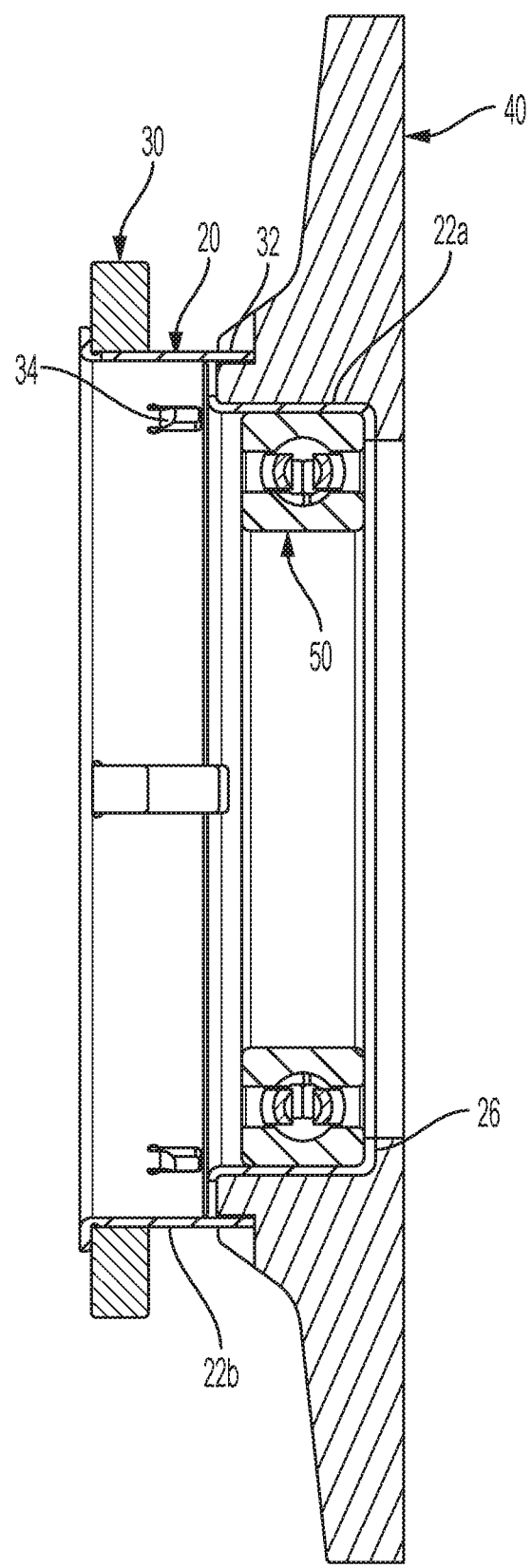
FIG. 3B is a side cross-sectional view of the sleeve of FIGS. 2A-2C in addition to the trigger wheel, the bearing assembly, and the rotor.
Figure 3C:
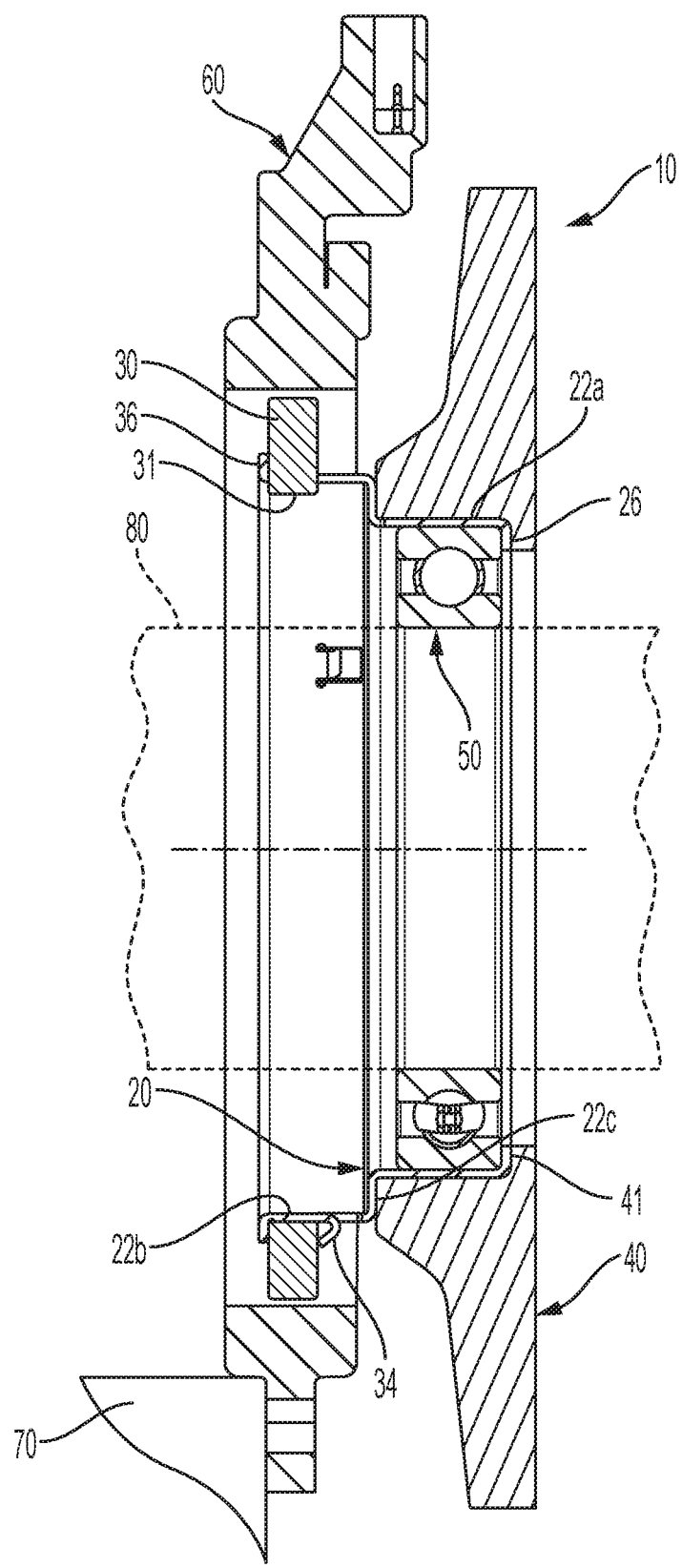
FIG. 3C is a side cross-sectional view of the sleeve of FIGS. 2A-2C in addition to the trigger wheel, the bearing assembly, the rotor, and a resolver.

A resolver integration kit 10 is illustrated in FIGS. 1 and 3C. The kit 10 includes a resolver integration sleeve 20 (hereinafter also referred to as a "sleeve") that essentially secures and positions a trigger wheel 30, a rotor 40, and a bearing assembly 50 relative to each other. In an installed condition, as shown in FIG. 3C, the trigger wheel 30 is arranged inside of a resolver 60, and the resolver 60 helps determine a relative rotational position of the rotor 40.

Figure 2A:
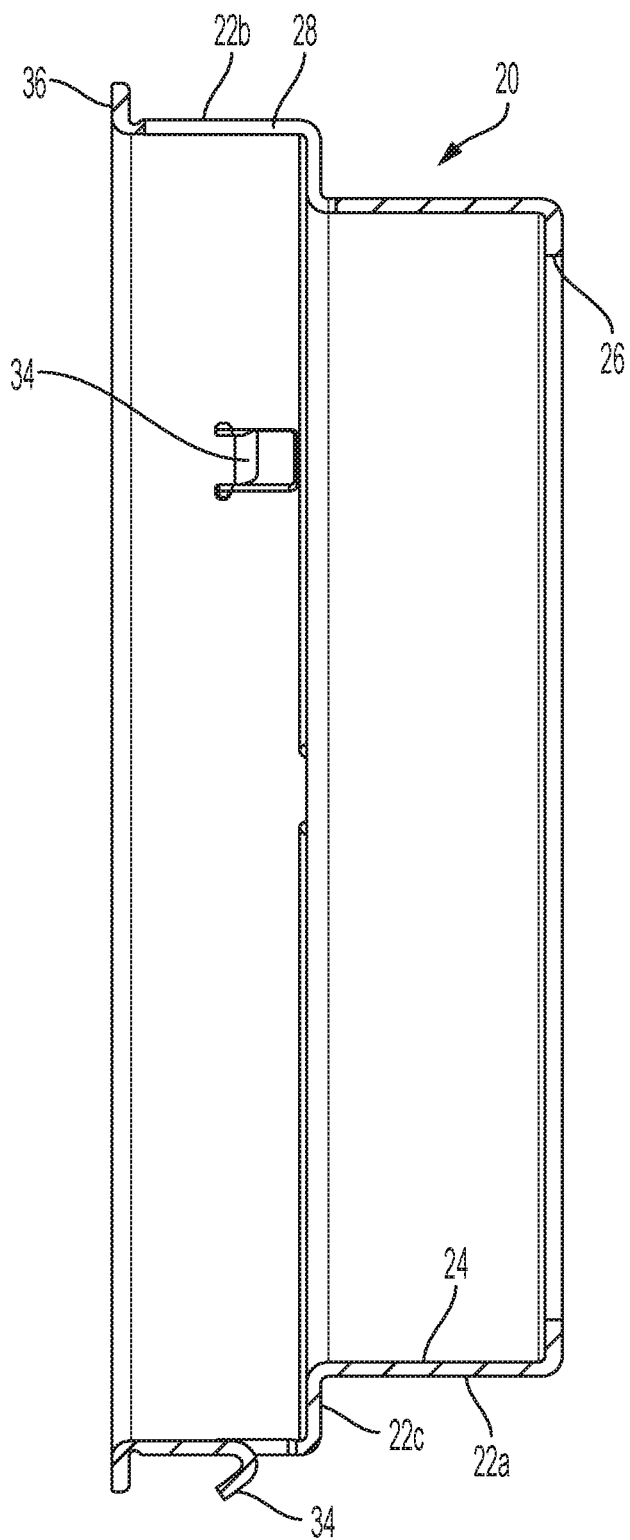
FIG. 2A is a side cross-sectional view of a sleeve for the resolver integration kit of FIG. 1.
Figure 2B:
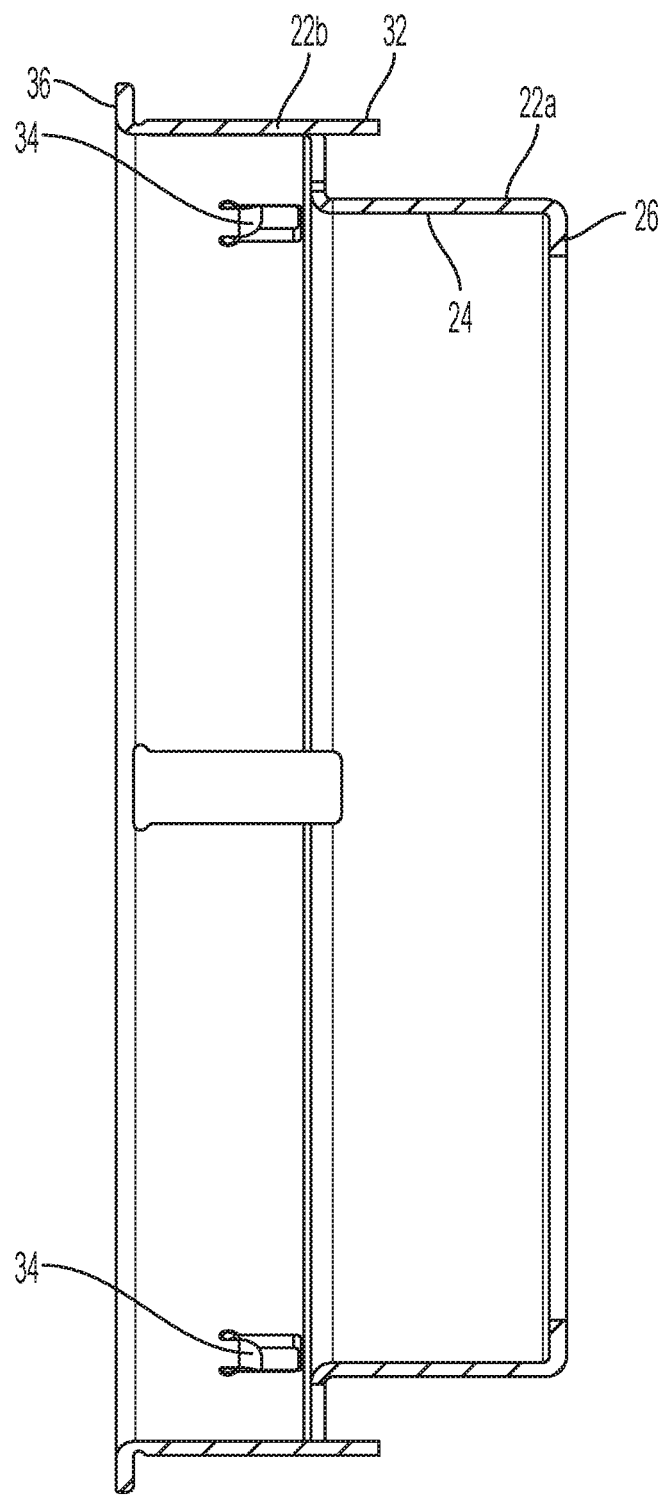
FIG. 2B is another side cross-sectional view of the sleeve for the resolver integration kit of FIG. 1.
Figure 2C:
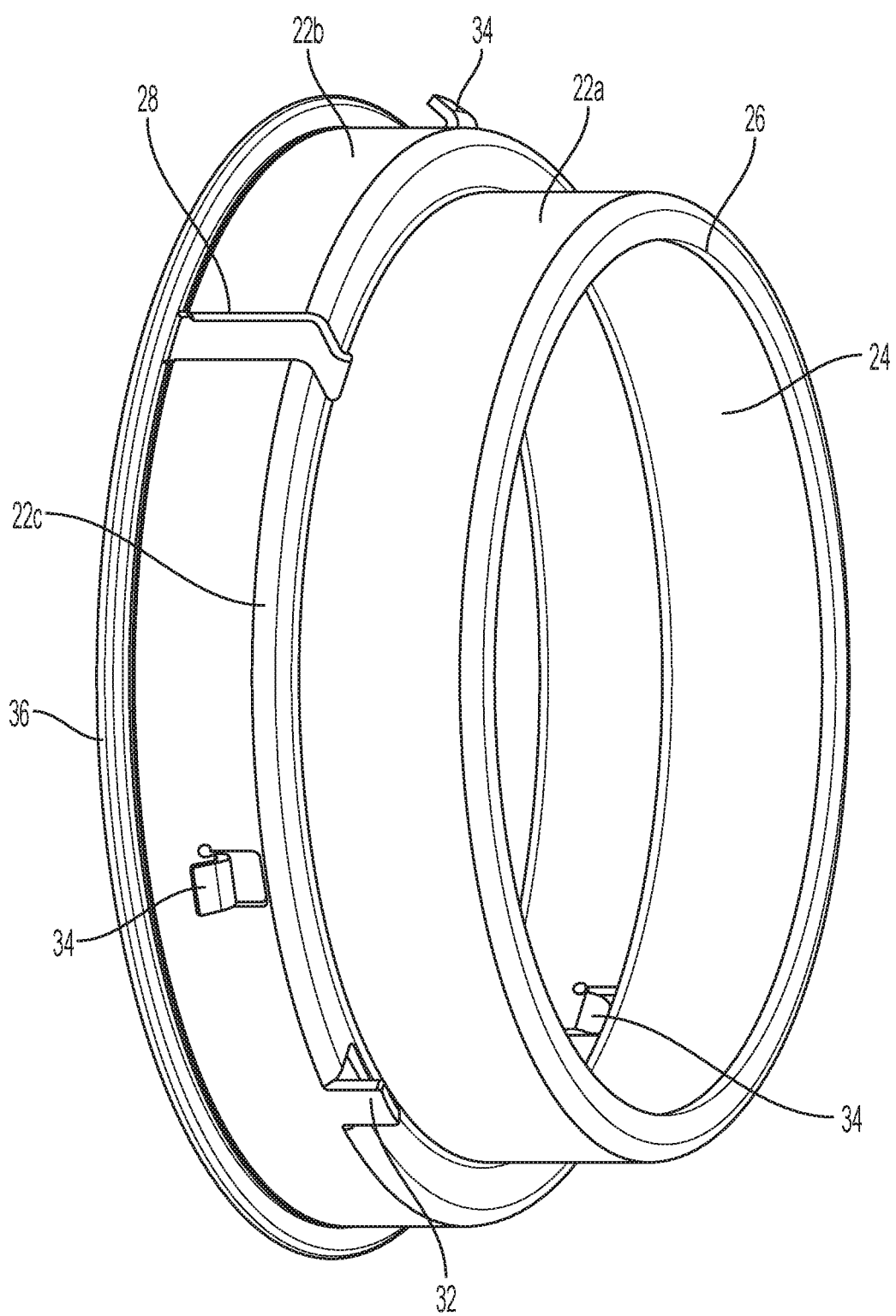
FIG. 2C is a perspective view of the sleeve for the resolver integration kit of FIG. 1.

As shown in FIGS. 2A-2C, the sleeve 20 includes a first axial section 22a including a radially inner surface 24 defining a bearing support and radially inwardly extending flange 26 defining an axial abutment surface, which is provided to act as an abutment surface for the bearing assembly 50. The resolver integration sleeve 20 includes a second axial section 22*b* including at least one anti-rotation slot 28 dimensioned to receive a portion (i.e. protrusion 31) of the trigger wheel 30. In one embodiment, at least one anti-rotation tab 32 extends axially towards the first axial section 22*a* and is dimensioned to be received by the rotor 40. At least one securing tab 34 extends radially outward and is configured to engage the trigger wheel 30. The second axial section 22*b* also includes a radially outwardly extending flange 36, which acts as an axial abutment surface for the trigger wheel 30.

The sleeve 20 includes a radial step 22*c* defined between the first axial section 22*a* and the second axial section 22*b*. The first axial section 22*a* has a smaller outer diameter than an outer diameter of the second axial section 22*b*. As shown in FIG. 3C, the radial step 22*c* acts as an abutment surface for the rotor 40. The rotor 40 can includes a shoulder 41 configured to engaged against an axial end of the sleeve 20, and more particularly against the radially inwardly extending flange 26.

The sleeve 20 is formed via at least one of deep-drawing or stamping. One of ordinary skill in the art would understand that other forms of manufacturing, such as punching, can be used to form the sleeve 20. In one embodiment, the sleeve 20 is formed from sheet metal. In one embodiment, the sleeve 20 has a uniform thickness.

As shown in FIG. 2C, the at least one anti-rotation slot 28, the at least one anti-rotation tab 32, and the at least one securing tab 34 are each circumferentially spaced away from each other along the sleeve 20. One of ordinary skill in the art would understand that the exact positioning of these components on the sleeve 20 can be varied.

As shown in FIGS. 3A-3C, the bearing assembly 50 is arranged radially inside of the first axial section 22*a* and is in contact with the radially inner surface 24 of the sleeve 20. The bearing assembly 50 is in axial abutment with the radially inwardly extending flange 26 of the sleeve 20.

As shown in FIGS. 3A-3C, the trigger wheel 30 surrounds the second axial section 22*b*. The trigger wheel 30 includes at least one inwardly directed anti-rotation protrusion 31 received within the at least one anti-rotation slot 28 of the second axial section 22*b*. The trigger wheel 30 is axially secured between the radially outwardly extending flange 36 of the second axial section 22*b* and the at least one securing tab 34. In one embodiment, the at least one anti-rotation slot 28 extends continuously from the radially outwardly extending flange 36 to the first axial section 22*a*.

The rotor 40 surrounds the first axial section 22*a* of the sleeve 20. The rotor 40 includes at least one anti-rotation notch 42 dimensioned to receive the anti-rotation tab 32 of the second axial section 22*b* of the sleeve 20. One of ordinary skill in the art would understand that a notch could be provided on the sleeve 20 and a tab could be provided on the rotor 40.

As shown in FIG. 3C, the resolver 60 is also provided circumferentially around the trigger wheel 30. As shown in FIG. 3C, the resolver 60 partially surrounds the rotor 40, the first axial section 22*a*, and the bearing assembly 50.

The sleeve 20 rotationally locks the rotor 40 and the trigger wheel 30, such that rotational movement experienced by the rotor 40 is transmitted via the sleeve 20 to the trigger wheel 30. Accordingly, there is no relative movement between the trigger wheel 30 and the rotor 40, which provides accurate control for the motor associated with the rotor 40. In other words, the rotor 40 and the trigger wheel 30 are configured to rotate together via the sleeve 20.

In one embodiment, an outer diameter for the bearing assembly 50 has an interference fit with the sleeve 20. Similarly, the rotor 40 is pressed onto the sleeve 20 to provide an interference fit. In one embodiment, the fit between the sleeve 20 and the trigger wheel 30 is an interference fit. In one embodiment, the connection between the sleeve 20 and the trigger wheel 30 is provided via engagement between the anti-rotation protrusion 31 of the trigger wheel 30 with the sleeve 20, and engagement of the securing tab 34 of the sleeve 20 with the trigger wheel 30. All connections between the components of the kit 10 are achieved without the requirement for additional fixing elements, such as bolts, screws, fasteners, etc.

Figure 4A:
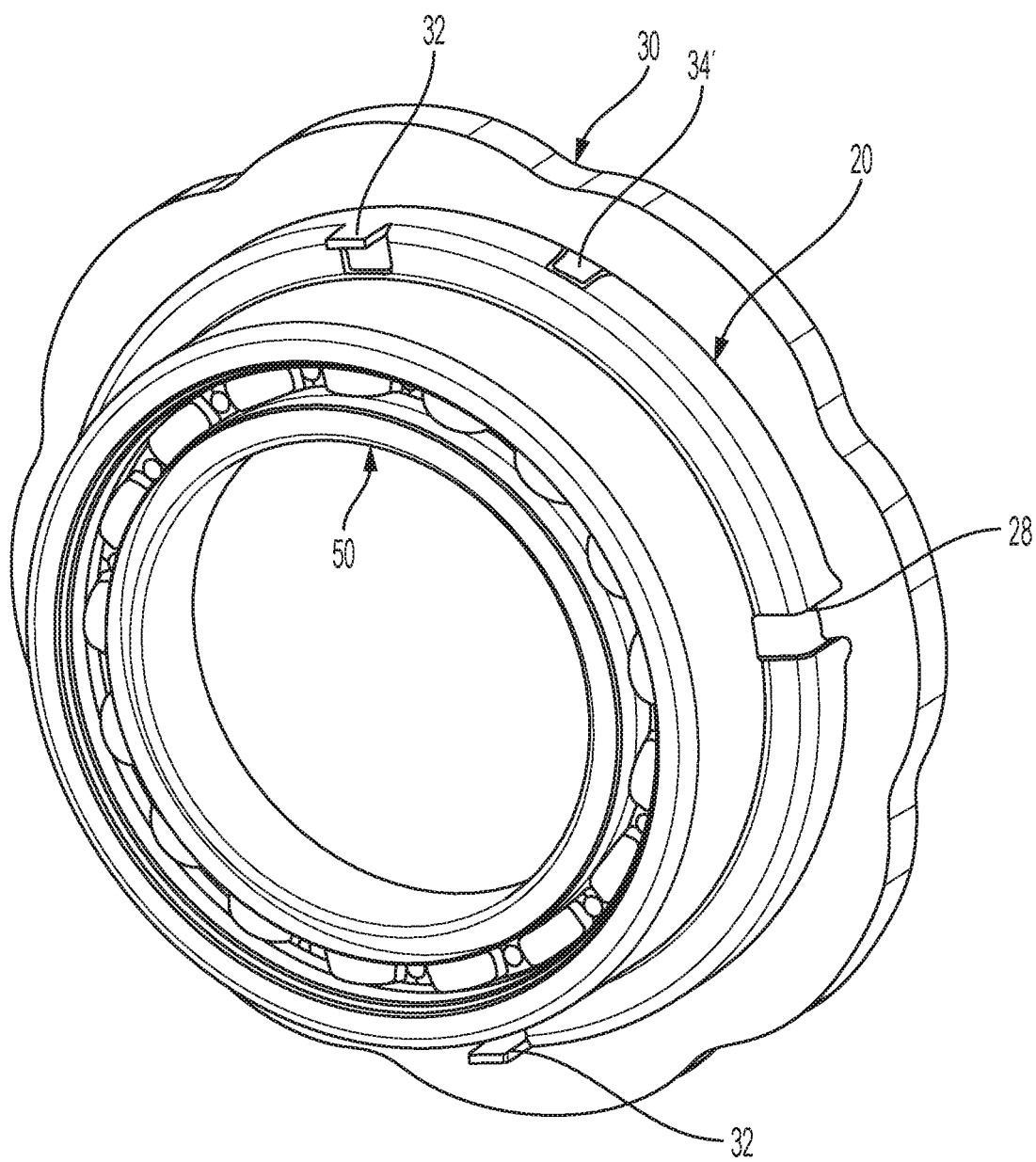
FIG. 4A is a perspective view of the sleeve, the bearing, and the trigger wheel, in which a securing tab on the sleeve is unbent.
Figure 4B:
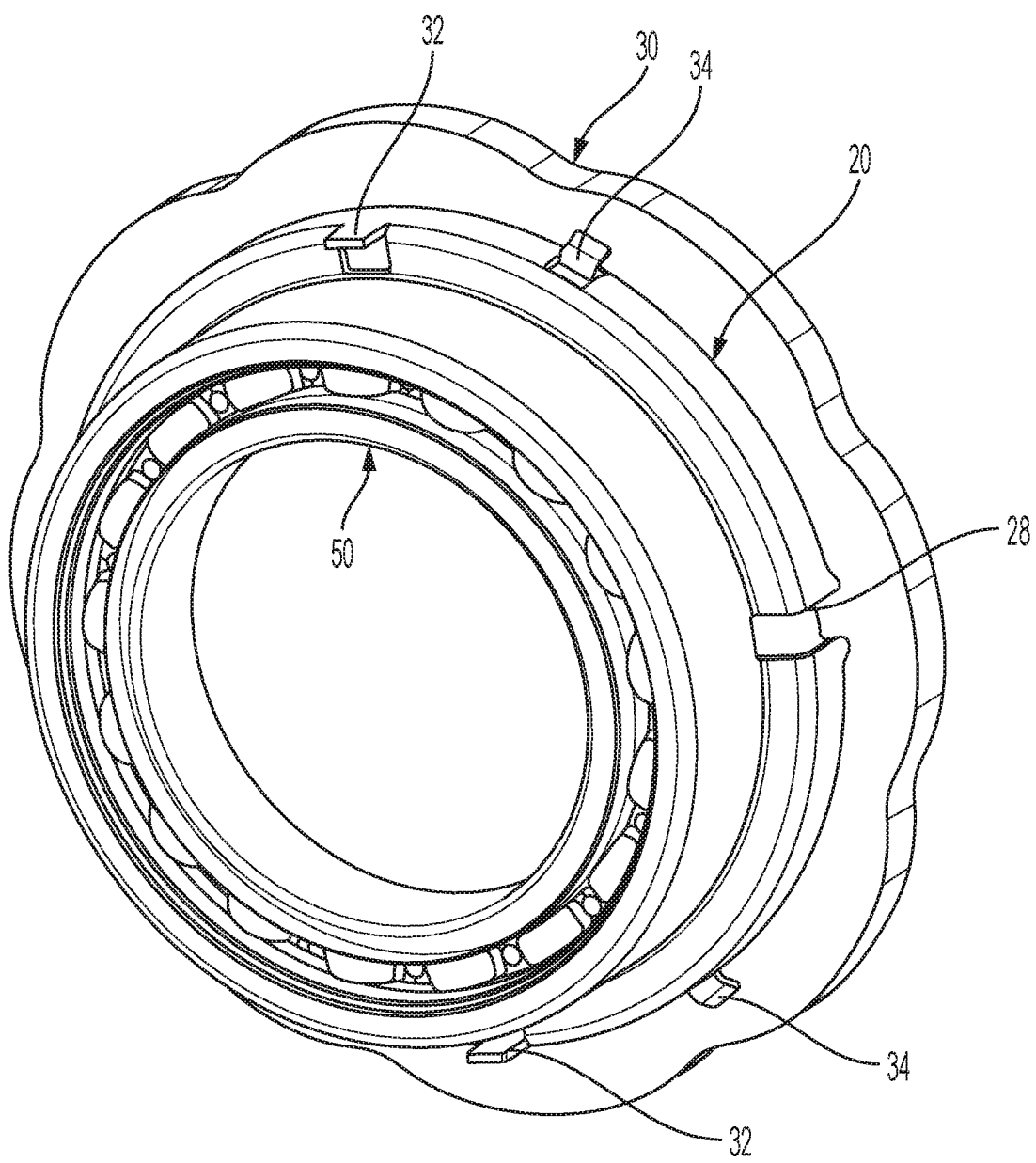
FIG. 4B is another perspective view of the sleeve, the bearing, and the trigger wheel, in which the securing tab on the sleeve is bent.
Figure 5:
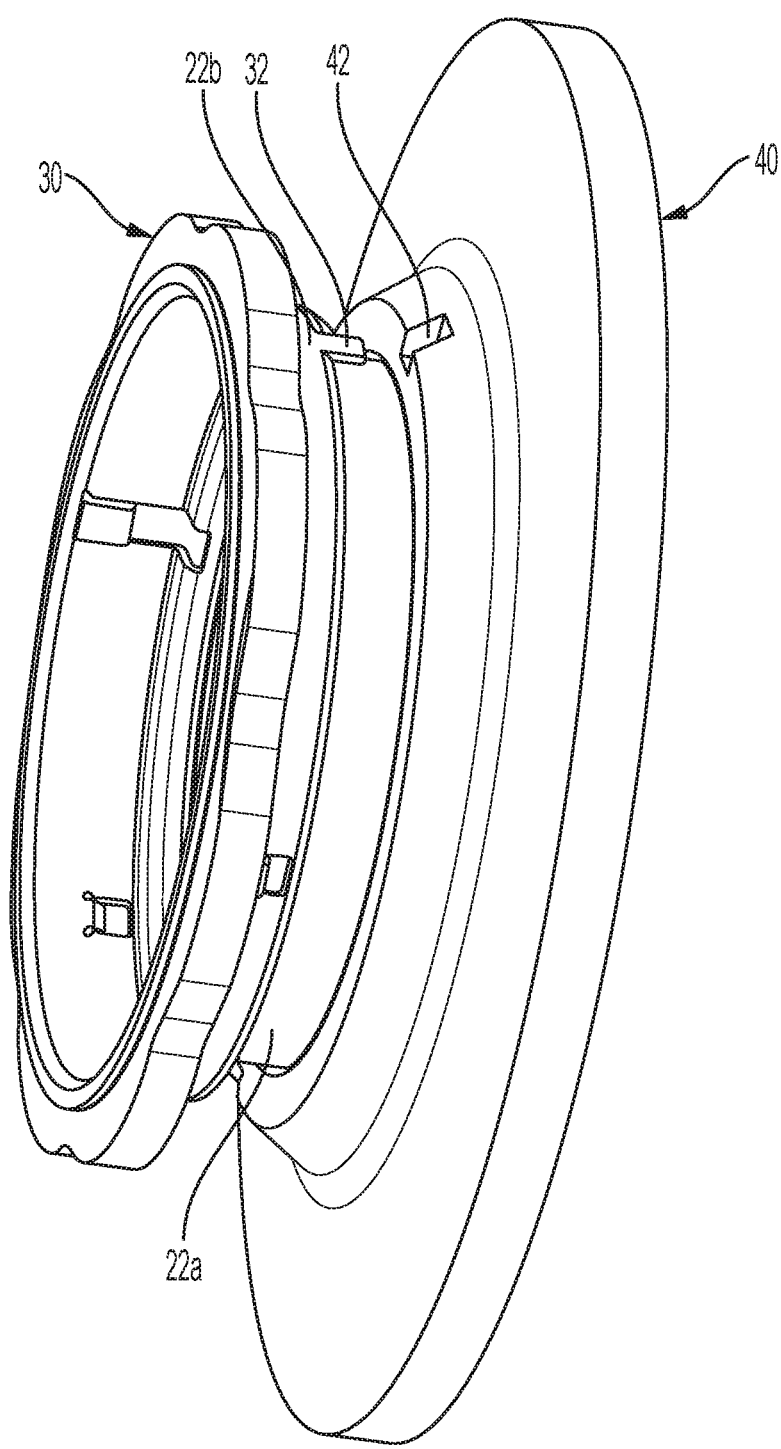
FIG. 5 is a perspective view of the sleeve, the rotor, and the trigger wheel prior to assembly.

A method of installing the kit 10 is also disclosed herein. The method includes (a) mounting the resolver 60 to a housing 70 (shown in FIG. 3C). The method includes (b) mounting the trigger wheel 30 to the sleeve 20 via at least one securing tab 34, which includes bending an initially un-bent tab 34' to a bent position (shown in FIGS. 4A and 4B). The method then includes (c) installing the bearing assembly 50 inside of the sleeve 20. The method includes (d) aligning the rotor 40 with the sleeve 20, such that the anti-rotation notch 42 of the rotor 40 is aligned with the anti-rotation tab 32 of the sleeve 20, and the rotor 40 is pressed onto the sleeve 20. The method also includes (e) mounting a shaft 80 (shown in FIG. 3C) inside of the bearing assembly 50.

Steps (b) and (c) can be performed during a pre-assembly step, such that a partially assembled configuration of the sleeve 20, trigger wheel 30, and the bearing assembly 50 can be provided as a single unit. Steps (a), (d), and (e) can be performed in the field or by an end user/customer. One of ordinary skill in the art would understand that more or less steps to the method may be required. In addition, the order of the steps can be performed in the stated order herein, or in an alternative order besides (a)-(e).

The embodiments disclosed herein vastly simplify the process of installing a resolver arrangement, and optimize the space for mounting the rotor 40 and trigger wheel 30. Instead of having to install the bearing assembly 50 and trigger wheel 30 separately, the present embodiments simplify the installation and only require installation of the bearing assembly 50 by incorporating the trigger wheel 30 with the bearing assembly 50 through use of the sleeve 20.

Although only a single size for the sleeve 20 is illustrated throughout the drawings, one of ordinary skill in the art would understand that the sleeve 20 can be varied in size to accommodate different applications.

The sleeve 20 is formed according to a simple manufacturing process, such as deep-drawing and/or stamping. No special finishing for the sleeve 20 is required, other than tumbling to remove sharp edges and normalization/annealing to remove residual stresses.

Figure 6A:
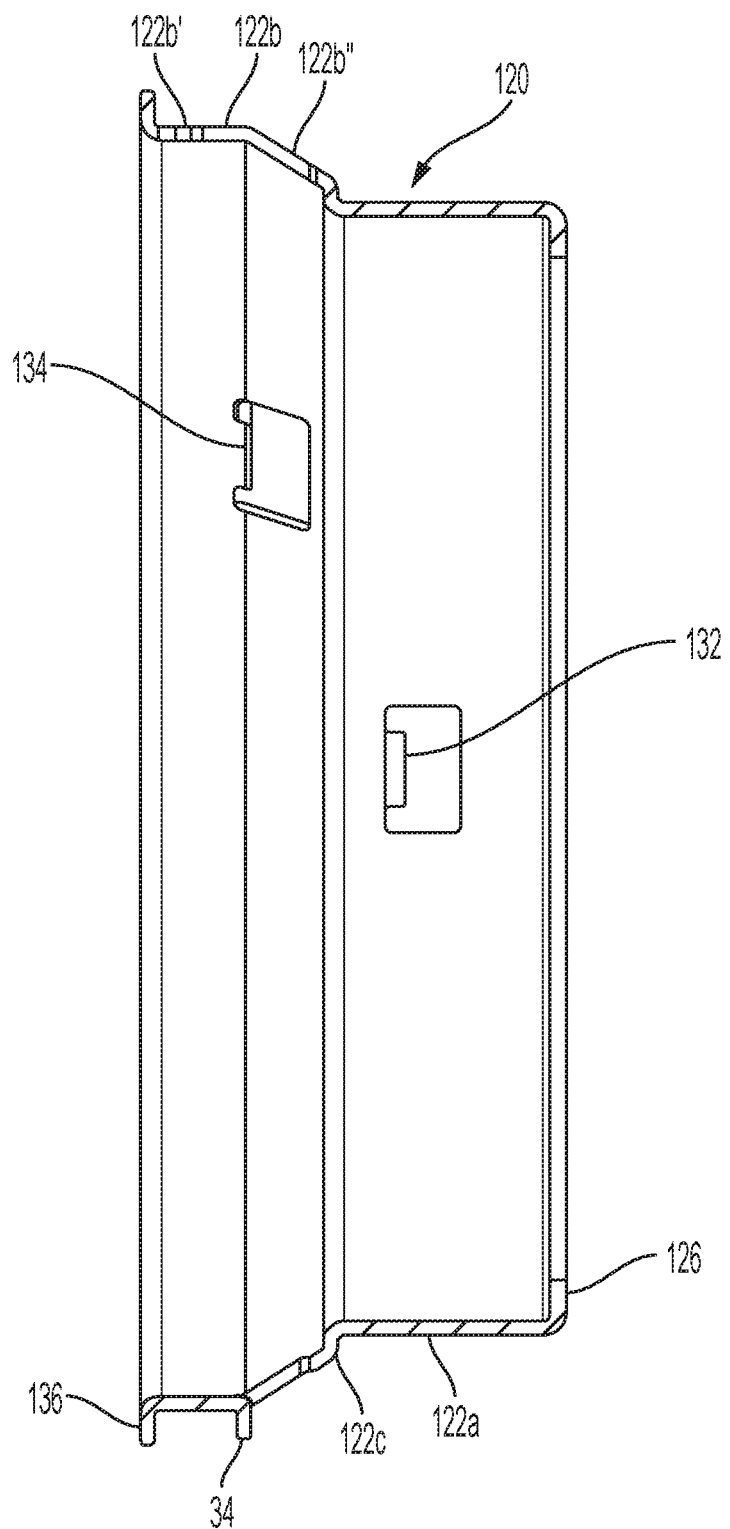
FIG. 6A is a cross-sectional view of an alternative embodiment of the sleeve.
Figure 6B:
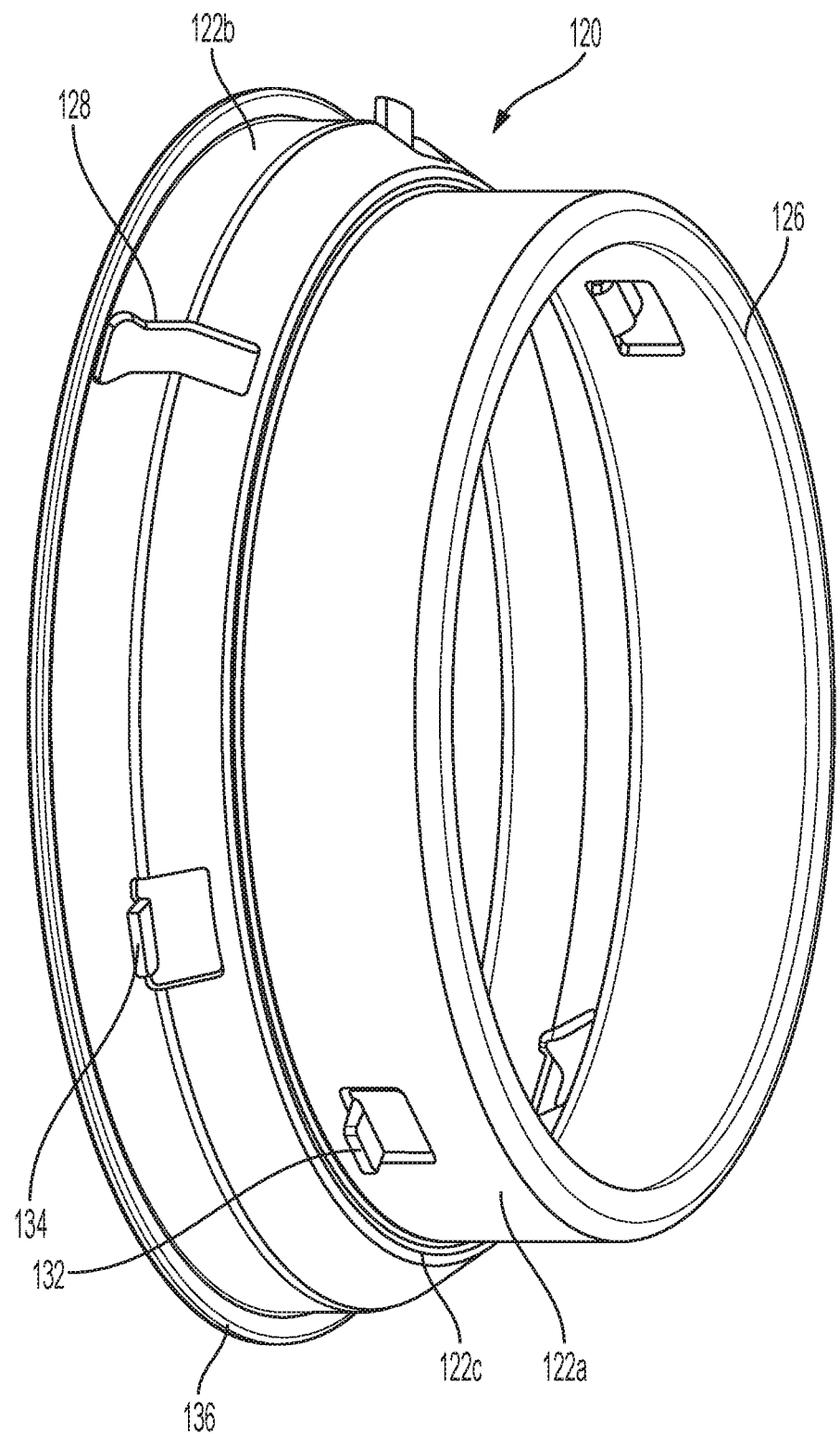
FIG. 6B is a side perspective view of the sleeve of FIG. 6A.
Figure 6C:
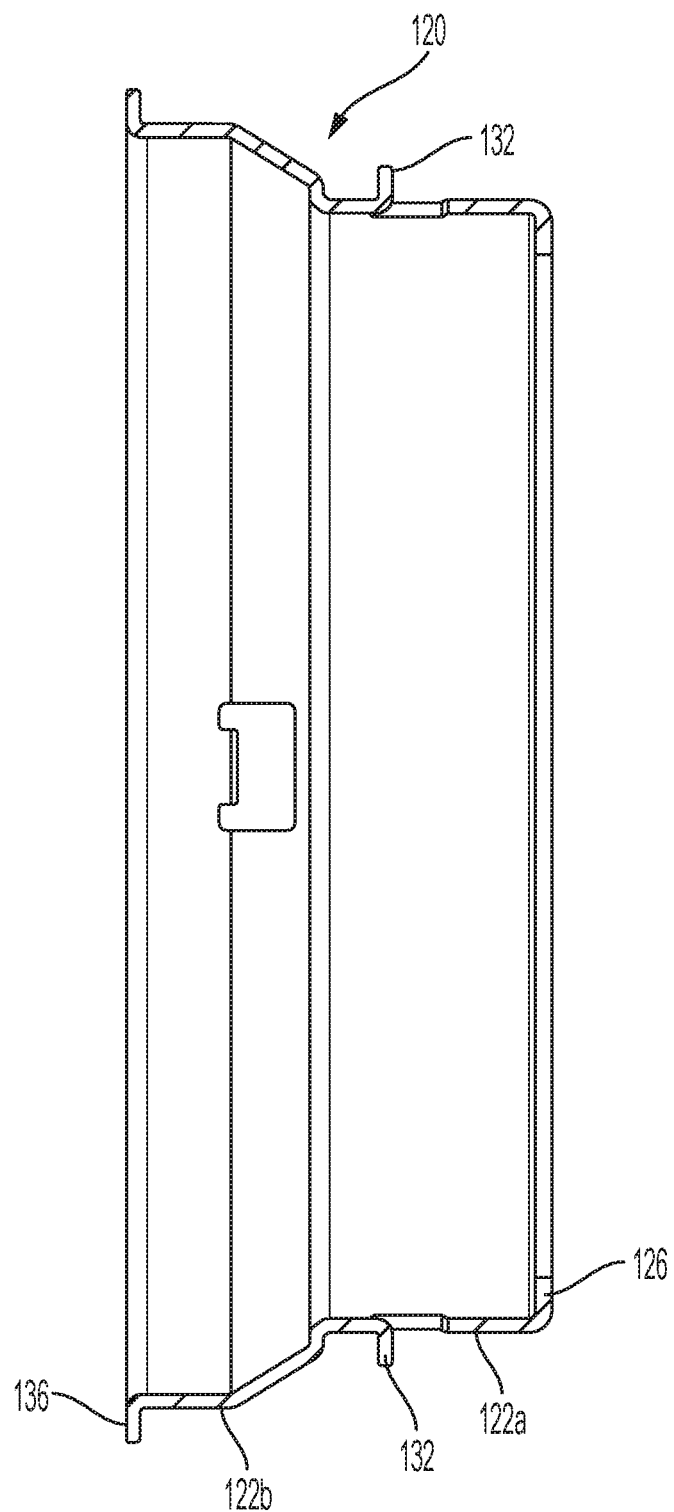
FIG. 6C is another cross-sectional view of the sleeve of FIGS. 6A and 6B.

FIG. 6A-6B illustrate another embodiment for the sleeve 120. All features identified in FIGS. 6A-6B are essentially and functionally identical to the features of the sleeve 20 in the other figures (are identified using similar reference numerals) except for the following elements. The second axial section 122*b* of the sleeve 120 is separated into two regions 122*b*' and 122*b*". The first region 122*b*' extends parallel to the first axial section 122*a* and a rotational axis of the sleeve 120. The second region 122*b*" tapers radially inward from the first region 122*b*' to the a step connected to the first axial section 122*a*. The degree of the tapering of the second region 122*b*" is between 10 degrees and 60 degrees, and more preferably is 30 degrees+/−5 degrees. The anti-rotation tab 132 of the sleeve 120 is also modified compared to the sleeve 20. In FIGS. 6A-6C, the anti-rotation tab 132 is defined on the first axial section 122*a* instead of the second axial section 122*b*. The anti-rotation tab 132 is positioned in a medial region of the first axial section 122*a* such that it is spaced away from the step and the radially inwardly extending flange 126. The sleeve 120 functions in the same way as the sleeve 20 in terms of how it engages with the other components of the kit.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS resolver integration kit 10
sleeve 20, 120
first axial section 22*a*, 122*a*
second axial section 22*b*, 122*b*
radial step 22*c*, 122*c*
radially inner surface 24
radially inwardly extending flange 26, 126
anti-rotation slot 28, 128
trigger wheel 30
anti-rotation protrusion 31
anti-rotation tab 32, 132
securing tab 34, 134
radially outwardly extending flange 36, 136
rotor 40
shoulder 41
anti-rotation notch 42
bearing assembly 50
resolver 60
housing 70
shaft 80

What is claimed is:

1. A resolver integration sleeve comprising:
   a first axial section including a radially inner surface defining a bearing support and radially inwardly extending flange defining an axial abutment surface for a bearing assembly, and
   a second axial section including at least one anti-rotation slot dimensioned to receive a portion of a trigger wheel, at least one securing tab extending radially outward and configured to engage a trigger wheel, and a radially outwardly extending flange,
   wherein at least one of the first axial section or the second axial section includes at least one anti-rotation tab dimensioned to be received by a rotor.

2. The sleeve of claim 1, wherein a radial step is defined between the first axial section and the second axial section, and the first axial section has a smaller outer diameter than an outer diameter of the second axial section.

3. The sleeve of claim 1, wherein the sleeve is formed via at least one of deep-drawing or stamping.

4. The sleeve of claim 1, wherein the sleeve has a uniform thickness.

5. The sleeve of claim 1, wherein the at least one anti-rotation slot, the at least one anti-rotation tab, and the at least one securing tab are each circumferentially spaced away from each other.

6. The sleeve of claim 1, wherein the radially inwardly extending flange and the radially outwardly extending flange are defined on axially opposite terminal ends of the sleeve.

7. The sleeve of claim 1, wherein the at least one anti-rotation slot continuously extends from the radially outwardly extending flange to the first axial section.

8. The sleeve of claim 1, wherein the at least one securing tab includes three securing tabs.

9. The sleeve of claim 1, wherein the at least one anti-rotation slot includes a single slot, and the at least one anti-rotation tab includes a single tab.

10. A resolver integration kit comprising:
    the resolver integration sleeve of claim 1;
    a bearing assembly arranged radially inside of the first axial section of the resolver integration sleeve and in contact with the radially inner surface of the resolver integration sleeve, the bearing assembly in axial abutment with the radially inwardly extending flange of the resolver integration sleeve;
    a trigger wheel surrounding the second axial section of the resolver integration sleeve, the trigger wheel including at least one inwardly directed anti-rotation protrusion received within the at least one anti-rotation slot of the second axial section of the resolver integration sleeve, the trigger wheel being axially secured between the radially outwardly extending flange of the second axial section and the at least one securing tab of the resolver integration sleeve; and
    a rotor surrounding the first axial section of the resolver integration sleeve, the rotor including at least one anti-rotation notch dimensioned to receive the at least one anti-rotation tab of the resolver integration sleeve.

11. The resolver integration kit of claim 10, further comprising a resolver, and the trigger wheel being positioned radially inside of the resolver.

12. The resolver integration kit of claim 11, wherein the resolver partially surrounds the rotor, the first axial section, and the bearing assembly.

13. The resolver integration kit of claim 10, wherein the sleeve is secured to both the bearing assembly and the rotor via a friction fit.

14. The resolver integration kit of claim 10, wherein the rotor and the trigger wheel are configured to rotate together via the sleeve.

15. The sleeve of claim 1, wherein the at least one anti-rotation tab is formed on the second axial section and the at least one anti-rotation tab extends axially toward the first axial section.

16. The sleeve of claim 1, wherein the at least one anti-rotation tab is formed on the first axial section.

17. The sleeve of claim 16, wherein the at least one anti-rotation tab is formed in an axially medial portion of the first axial section.

18. The sleeve of claim 1, wherein the second axial section includes a first region extending parallel to the first axial section and a second region that is tapered.

19. The sleeve of claim 18, wherein the least one securing tab is positioned at an intersection of the first region and the second region of the second axial section.

20. A method of installing a resolver integration kit, the method comprising:

(a) mounting a resolver to a housing via at least one of radial abutment or axial abutment between the resolver and the housing;
(b) mounting a trigger wheel to a sleeve via at least one securing tab;
(c) installing a bearing assembly inside of the sleeve;
(d) aligning a rotor with the sleeve, such that an anti-rotation notch of the rotor is aligned with an anti-rotation tab of the sleeve, and pressing the rotor onto the sleeve; and
(e) mounting a shaft inside of the bearing assembly via engagement between a radially outer surface of the shaft and a radially inner surface of the bearing assembly.

* * * * *